Dec. 31, 1957 R. A. OBERDORF 2,818,212

CARD READER DEVICE

Filed Dec. 23, 1954 2 Sheets-Sheet 1

INVENTOR.
ROBERT A. OBERDORF

BY Morris Rabkin

ATTORNEY

INVENTOR.
ROBERT A. OBERDORF
BY Morris A. Rabkin
ATTORNEY

United States Patent Office 2,818,212

Patented Dec. 31, 1957

2,818,212

CARD READER DEVICE

Robert A. Oberdorf, Merchantville, N. J., assignor to Radio Corporation of America, a corporation of Delaware Application December 23, 1954, Serial No. 477,250

10 Claims. (Cl. 235—61.11)

This invention relates to reading devices, and particularly to a device for reading information recorded on perforated cards.

Automatic systems for processing information are being increasingly used in modern commerce. In department stores, for example, cards or tags may be attached to individual pieces of merchandise. These cards or tags may contain, in perforation patterns, information pertaining to the merchandise. At the time of sale, or other change of status of the merchandise, the card may be removed. The information on the card may then be read and recorded automatically for further handling, as in automatic accounting, or other data processing machines.

Information recorded on such cards should be translated accurately and rapidly. A considerable number of card readers may be employed in a business, so that any card reading device should also be economical to construct and operate. A card reader should be simple and compact in construction, and rugged and reliable in operation. Further, the device should preferably read information packed densely on small perforated cards, that is, cards of the size of the customary merchandise tags.

Therefore, an object of this invention is to provide an improved perforation sensing mechanism which can operate on compactly recorded information.

Another object of this invention is to provide an improved perforation reading mechanism which is simpler, more compact, and more economical than the mechanisms of the prior art.

Another object of this invention is to provide an improved card reader for rapidly and reliably sensing perforation patterns recorded in small information-bearing cards.

A further object of this invention is to provide an improved card reader characterized by simplicity of operation and economy of construction for automatically reading information stored as perforations on small information-bearing cards.

A card reading mechanism provided in accordance with the invention advances a card in successive steps, sensing the card at each step. The card is placed on a toothed slide which is stepped by a pawl arrangement under control of a rotary solenoid. A sensing mechanism comprising a number of feeler members and a number of actuating fingers is also controlled, through a cam arrangement, by the rotary solenoid. Before each advancing step, the feeler members sense a column of perforation positions on the card. Small electro-mechanical switches are closed wherever perforations are sensed. When all perforation positions on the card have been sensed, a toggle-type linkage mechanism is actuated which ejects the card from the slide and disengages the pawl arrangement from the teeth on the slide. The slide is then returned to the starting position.

The novel features of the invention, as well as the invention itself, both as to its organization and method of operation, will best be understood from the following description, when read in connection with the accompanying drawings, in which like reference numerals refer to like parts, and in which.

Figure 3:
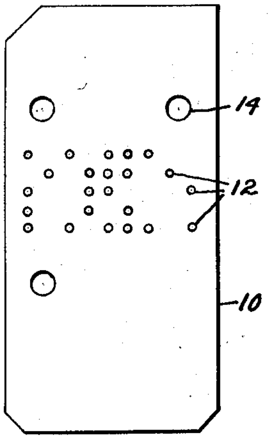
Fig. 3 is a representation of a type of card, such as a small commercial tag, which may be sensed by the card reader device of the invention.

A card, such as a small commercial tag 10 (Fig. 3) useful for identifying individual pieces of merchandise, may have small information perforations 12 and relatively larger positioning perforations 14. The information perforations 12 may be in columns parallel to the length of the tag 10 and rows extending transversely across the tag 10. The columns have like numbers of perforation positions, but information perforations 12 are made only at certain rows within a column, to correspond to a desired character combination. A series of characters is thus represented by a series of columnar perforation combinations. The card shown in Fig. 3 is an illustration only of a card or tag which may be employed, and does not precisely show the scale or relationship of the perforations.

A card reader device (see Figs. 1 and 2) in accordance with the invention includes a base structure 20 providing support and reference for a number of moving members. A rotary solenoid 22 (best seen in Fig. 2) is energized when actuated automatically or by an operator. The rotary solenoid 22 drives a central actuating shaft 24 rotatably mounted in the base structure 20. The central actuating shaft 24 is transverse to the direction of movement of a tag 10, which is along a longitudinal axis from right to left, as viewed in Figs. 1 and 2. Hereafter, the right side of the mechanism is referred to as the tag entry side, and the left side is referred to as the tag exit side.

Figure 1:
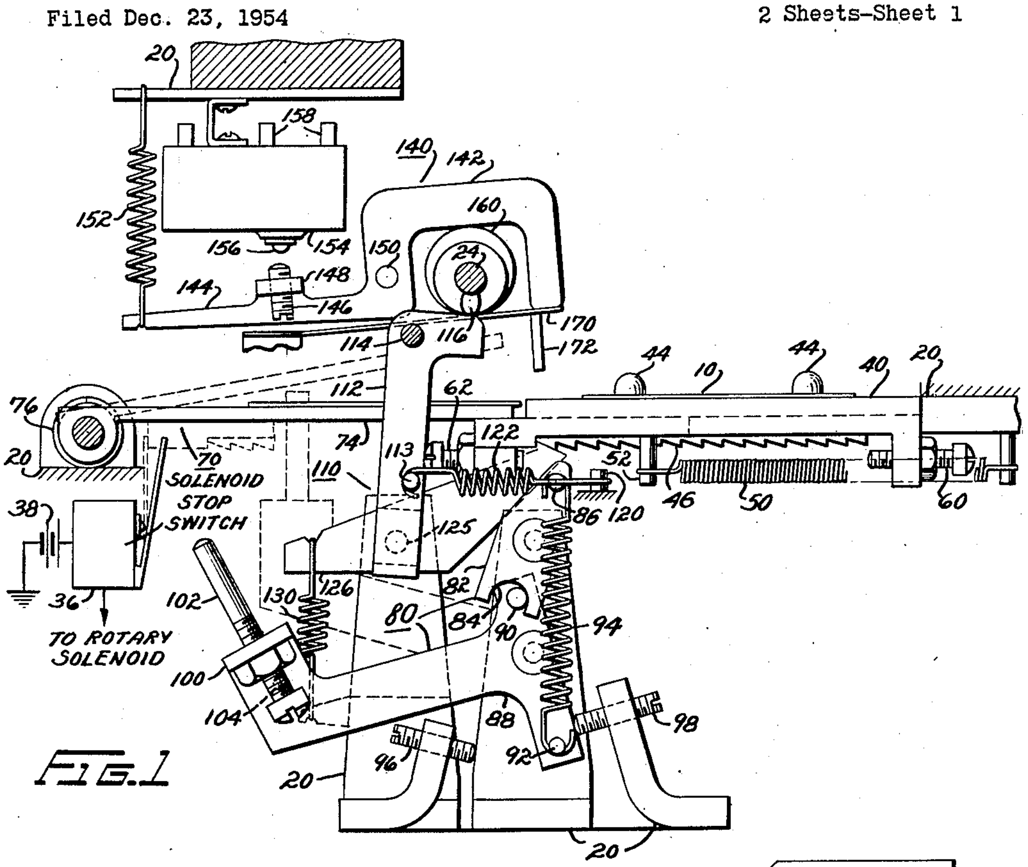
Fig. 1 is a sectional view of a card reader in accordance with the invention, taken along the line 1—1 of Fig. 2 in the direction of the appended arrows (this view is hereafter referred to as the front view of the mechanism)
Figure 4:
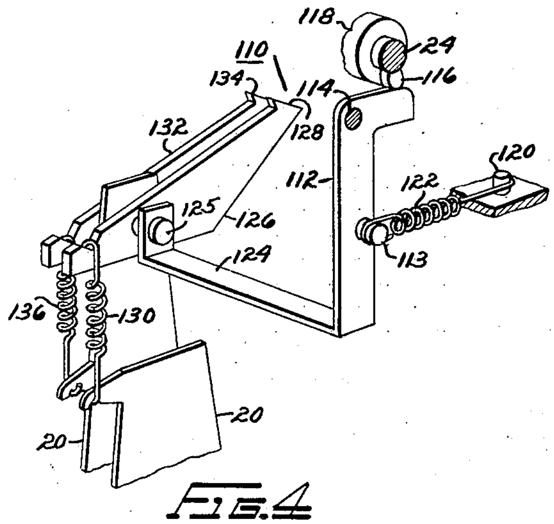
Fig. 4 is a perspective view of a portion of the card reader, showing in detail the pawl arrangement for advancing the card.
Figure 2:
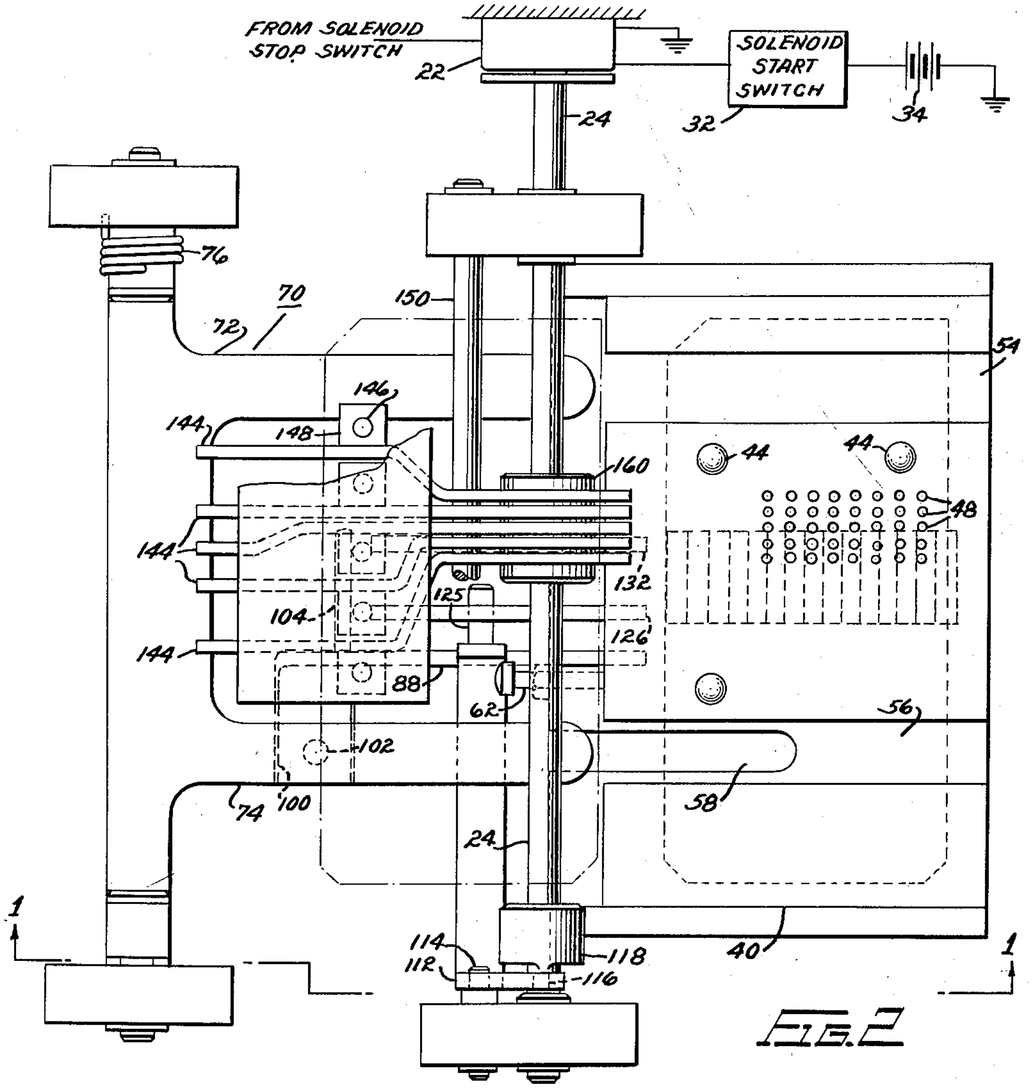
Fig. 2 is a plan view, partly broken away, of the card reader of Fig. 1.

The rotary solenoid 22 provides repeated rotary movements of a shaft 24 through a predetermined angle from and to a start position. These movements are counterclockwise, as viewed in Fig. 1, and through a travel of approximately 90° from the start position. The rotary solenoid 22 and central actuating shaft 24, where shown in Figs. 1, 2, and 4, are at approximately the end of their travel from the start position. The solenoid 22 is here energized by a manually operated solenoid start switch 32 coupled to a D.-C. voltage source 34. On energization, the solenoid 22 repeatedly rotates the central actuating shaft 24 through the desired travel, and back to the start position. The solenoid 22 automatically repeats these movements until a stop or de-energizing signal is provided from a mechanically-actuated solenoid stop switch 36 (Fig. 1) coupled to a D. C. voltage source 38.

Figure 5:
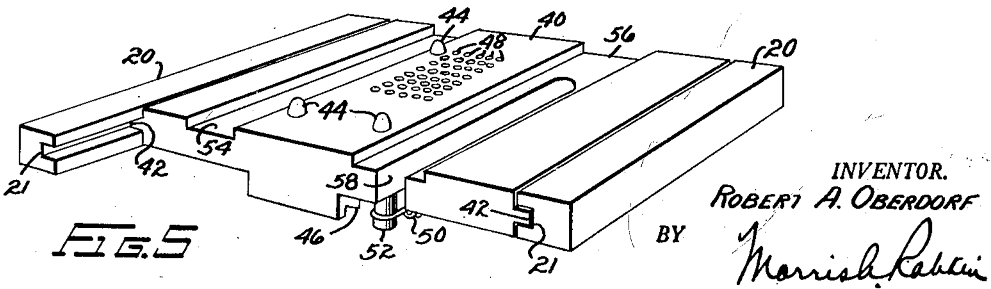
Fig. 5 is a perspective detail view of a portion of the card reader, showing in detail the card-holding slide.

A tag-holding slide 40 (see Figs. 1, 2, and 5) is slidably mounted in the base structure 20 to move along the longitudinal axis between the tag exit and tag entry sides of the mechanism. The illustration of the tag-holding slide 40, as well as that of other members shown herein, is not intended to be to scale. The slide 40 has side tongue portions 42 fitting between mating grooves 21 in the base structure 20. Positioning pins 44, for the positioning perforations of a tag, are provided on the upper part of the slide. A row of teeth 46, which may be integral with the slide 40, extend approximately down the center of the slide 40 on its underside. An array of guide holes 48, one for each perforation position of a tag to be sensed, is provided on the upper surface of the slide 40. The slide 40 is biased toward the tag entry side of the mechanism by a spring 50 coupling a pin 52 on the slide 40 to the base structure 20. Ejector arm grooves 54, 56 are provided in the upper surface of the slide 40, and extend in the direction of tag 10 movement. A longitudinal clearance slot 58 is cut into one of the ejector arm grooves 56. An adjustable set screw 60 (see Fig. 1), hereinafter called the stop member 60, is threaded into a tab at the tag entry side of the slide 40. Another adjustable set screw 62, hereinafter called the reset member 62, is threaded into a tab at the tag exit side of the slide 40.

A stripper or ejector mechanism 70 (see Figs. 1 and 2) is rotatably mounted in the base structure 20 at the tag exit end. The stripper mechanism 70 includes a pair of ejector arms 72, 74, each of which may slide within a different one of the ejector arm grooves 54, 56 in the tag-holding slide 40. A spring 76 biases the stripper mechanism 70 so that the ejector arms 72, 74 are normally in engagement with the matching grooves 54, 56.

An ejector control mechanism 80 controls the stripper mechanism 70 in response to the position of the slide 40. A trigger 82 and a hammer 88 are pivotally mounted in the base structure 20. The sides of one end of the trigger 82 are in the path of movement of the stop member 60 and the reset member 62 on the slide 40. The other, lower end of the trigger 82 includes a hemispherical portion 84 in registry with a fixed toggle pin 90 on the hammer 88. A spring 94 coupling the trigger 82 and hammer 88 exerts tension on and tends to draw together a pin 86 on the trigger 82 and a pin 92 on the hammer 88. Movement of the hammer 88 is restricted by a pair of adjustable limiting set screws 96, 98 mounted in the base structure 20. An extended arm of the hammer 88 includes a tab portion 100 in which is mounted an adjustable ejector stud 102. The ejector stud 102, at one limit of its movement, engages one of the ejector arms 74 on the stripper mechanism 70. A disengaging pin 104 is also mounted on the extended arm of the hammer 88, and is employed, as described below, in temporary disengagement of the pawl arrangement.

A slide advancing arrangement 110 (see Figs. 1 and 4) drives the slide 40 from the central actuating shaft 24. A pawl crank 112 is rotatable about a shaft 114 mounted in the base structure 20. A stepping control stud 116 is mounted on a hub 118 fixed to the central actuating shaft 24. Through a predetermined arc of the movement of the central actuating shaft 24, the stepping control stud 116 engages and pivots the pawl crank 112. The pawl crank 112 is biased toward engagement with the stepping control stud 116 by a spring 122 coupling a pin 113 on the pawl crank 112 to a post 120 fixed to the base structure 20.

The wall crank 112 includes a support bar 124 extending transverse to the direction of tag movement. A stepping pawl member 126 is pivotally mounted on the end of the support bar 124 by a pin 125 fixed in the support bar 124. The plane in which the stepping pawl member 126 pivots is normal to the plane of the teeth 46 on the slide 40. A stepping pawl 128 at one end of the stepping pawl member 126 is normally held in engagement with the teeth 46 by a spring 130 coupling the member 126 to the base structure 20.

A holding pawl member 132 is pivotally mounted in the base structure 20, parallel to the stepping pawl member 126. One end of the holding pawl member 132 has a holding pawl tip 134, normally held in engagement with the teeth 46 on the slide 40 by a spring 136 coupled to the base structure 20. Both of the pawl members 126 and 132 are contacted by the disengaging pin 104 on the hammer 88 when the hammer 88 is at the clockwise (as viewed in Fig. 1) limit of its movement. The disengaging pin 104 may pivot both pawl members 126 and 132, so that the stepping pawl 128 and holding pawl 134 are both disengaged from the teeth 46 on the slide 40.

The sensing mechanism (see Figs. 1 and 2) includes a number of actuating fingers 140 pivoting on a shaft 150 mounted in the base structure 20 transverse to the direction of tag movement. Each actuating finger 140 includes a U-portion 142 extending from one side of the shaft 150, and a lever arm 144 extending from the other side of the shaft 150. A switch contact 146, here a set screw, is mounted in a tab 148 on the lever arm 144. Each actuating finger 140 is biased in a clockwise direction (as viewed in Fig. 1) by a spring 152 coupling the free end of the lever arm 144 to the base structure 20. A separate small electro-mechanical output switch 154 for each actuating finger 140 has a contact button 156 in the path of movement of the associated switch contact 146. Signals, as desired, may be derived from terminals 158 on each of the switches 154.

A sensing control cam 160 is mounted on the central actuating shaft 24 within the U-portions 142 of the actuating fingers 140. The fingers 140 are urged into contact with the sensing control cam 160 by the biasing springs 152. As here shown, the sensing control cam 160 may be of circular contour and mounted eccentrically with respect to the central actuating shaft 24. The sensing control cam 160 is so mounted as to pivot the actuating fingers 140 counter-clockwise as the rotary solenoid 22 moves toward the end of its travel from the start position.

A different resilient feeler member 170 having a sensing tip 172 is in the line of the free end of the U-portion 142 of each of the actuating fingers 140. The resilient feeler members 170 are mounted in the base structure 20 so as to tend to remain away from the plane of a tag 10 on the slide 40.

Each sensing tip 172 is in the line of a different row of guide holes 48 in the slide 40. The sensing tips 172 may be moved against a tag 10 along a common line, which may be termed a perforation sensing line. The individual positions contacted by the different sensing tips 172 may be termed perforation sensing points. Five actuating fingers 140 are here shown, by way of illustration, for operation with a tag 10 using a maximum of five perforations for a character. The number of perforations per character, and characters per card, may, however, be varied as desired.

In operation (referring now to the several figures), a tag 10 to be sensed may be placed by an operator on the tag-holding slide 40. The tag 10 is placed so that the large positioning perforations 14 match the positioning pins 44 on the slide 40. When the tag 10 is so positioned, the information perforations 12 on the tag 10 are each directly over a different one of the guide holes 48 in the slide 40.

The mechanism is started by manual actuation of the solenoid start switch 32. The rotary solenoid 22 initially provides a counter-clockwise (as viewed in Fig. 1) rotation of its shaft 24, through an approximately 90° travel. On reaching the limit of its movement, the rotary solenoid 22 is temporarily de-energized, and returns, under the bias of an internal spring (not shown), to the start position. The return motion of the shaft 24 is clockwise (as viewed in Fig. 1). Immediately on reaching the start position, the shaft 24 of the rotary solenoid 22 again undertakes a counter-clockwise (as viewed in Fig. 1) advance movement. These advance and return rotations are automatically repeated, in the same amplitude and from the same start position, until the shaft 24 of the rotary solenoid 22 receives a stop signal from the solenoid stop switch 36. The stop signal shuts off the rotary solenoid 22.

In the start position of the rotary solenoid 22, the stepping control stud 116 is at the same level as the central actuating shaft 24. In the views of Figs. 1, 2, and 4, the system is represented as the rotary solenoid 22 is approximately at the end of its advance movement.

Each advance movement of the rotary solenoid 22 first effects a sensing, then an advancing, of the tag 10. Assume here that a tag 10 has been stepped, in a manner to be described later, to a point at which a column of information perforations 12 is at the perforation sensing position. At the start of the cyclic movement of the rotary solenoid 22, the radius of the sensing control cam 160 provided to the following surfaces of the actuating fingers 140 is relatively small. The actuating fingers 140 pivot clockwise (as viewed in Fig. 1) under the urging of the biasing springs 152. The free ends of the U-portions 142 of the actuating fingers 140 hold the associated feeler members to the tag 10. In this action, the biasing effect of the springs 152 overcomes the tendency of the resilient feeler members 170 to remain spaced from the tag 10. The sensing tips 172 of the feeler members 170 extend through information perforations 12, where they exist, into the guide holes 48 in the tag-holding slide 40. If a sensing tip 172 contacts a perforation position in the tag 10 which has not been perforated, the sensing tip 172 is held against, not forced through, the tag 10. The surface of the slide 40 surrounding the guide holes 48 provides a backing for the tag 10. In addition, the urging force of the springs 152 is partly counteracted by the resiliency of the feeler members 170.

Thus, where a perforation exists at a sensing point, the associated actuating finger 140 is pivoted further clockwise (as viewed in Fig. 1) than where a perforation does not exist. The switch contacts 146 on the lever arm 144 portions of the actuating fingers 140 close, or do not close, the associated output switches 154, in correspondence to the perforation combination in the sensed column on the tag 10. For example, if only the middle perforation position of a five position column is punched out, only the middle sensing tip 172 penetrates the tag 10, only the middle switch contact 146 engages its associated output switch contact button 156, and only the middle output switch 154 is closed. Signals may thus be provided, in any desired manner, at the terminals 158 of the output switches 154 to represent the coded pattern sensed at the tag 10.

As stated above, a cycle begins with the sensing of the tag 10. As the rotary solenoid 22 carries out its counterclockwise (as viewed in Fig. 1) advance movement the sensing control cam 160 pivots the actuating fingers 140 counterclockwise (as viewed in Fig. 1). Thus, because of the resiliency of the feeler members 170 the sensing tips 172 withdraw from the tag 10. At the end of the rotary solenoid 22 advance travel, the sensing tips 172 are approximately in the position of Fig. 1 with respect to the tag 10.

The advance movement of the rotary solenoid 22, however, steps the slide 40 and tag 10 one tooth 46 position. The pawl crank 112 is normally biased in a counter-clockwise (as viewed in Fig. 1) direction by the coupled spring 122. When the rotary solenoid 22 and the central actuating shaft 24 reach the position of Fig. 1, however, near the end of the advance travel, the stepping control stud 116 engages the pawl crank 112. The stepping control stud 116 pivots the pawl crank 112 clockwise (as viewed in Fig. 1). The lower end of the pawl crank 112 moves toward the tag exit side of the mechanism, carrying the stepping pawl member 126 in the same direction. Because the stepping pawl 128 is held in engagement with the associated tooth 46 of the slide 40, the stepping pawl 128 draws the slide 40 and the tag 10 toward the tag exit side. The movement is an increment of one tooth 46 pitch. During the time the slide 40 is being shifted by the stepping pawl 128 the holding pawl tip 134 rides over the crest of one tooth 46 and engages the straight side of the next tooth 46. The holding pawl 134 is maintained in continuous engagement with a tooth 46 during the remainder of the cycle. Thus, the slide 40 is not drawn back to the tag entry side by the coupled spring 50 even though the stepping pawl member 126 shifts position.

At the limit of the advance travel of the rotary solenoid 22, the tag 10 has been sensed and advanced. As the rotary solenoid 22 and the central actuating shaft 24 carry out the clockwise (as viewed in Fig. 1) return movement, the system is prepared for a new cycle. The stepping control stud 116 disengages from the pawl crank 112. The pawl crank 112 therefore rotates counter-clockwise (as viewed in Fig. 1), moving the stepping pawl member 126 toward the tag entry side. Accordingly, the stepping pawl tip 128 rides over the crest of a tooth 46 and engages the same tooth 46 as the holding pawl 134. The slide 40 and tag 10 are again stationary, and remain so until the next rotary solenoid 22 advance travel. As the rotary solenoid 22 and central actuating shaft 24 return to start position, the sensing tips 172 of the feeler members 170 are moved to engage the tag 10. A new sensing of the tag 10 is thus provided with the next perforation column on the tag 10.

Advancing movements of the slide 40 from the start position are carried out in the manner described above. Until an information perforation column is at the sensing position, however, no outputs are provided. Similarly, no outputs are provided after all the characters have been sensed, and successive advance movements are repeated until a tag 10 is ejected.

When the slide 40 reaches the end of its stepwise movement toward the tag exit end, the tag 10 is ejected and the mechanism is reset to receive a new tag. The trigger 82 and the hammer 88 are arranged to provide a toggle-type action. That is, the trigger 82 and hammer 88 have two clearly distinct and stable positional relationships. Changeover from one relationship to another is rapid, but requires a positive impetus. In one stable position (here called a start position), the trigger 82 is biased clockwise and the hammer 88 is biased counter-clockwise (both directions being viewed as in Fig. 1) by the coupling spring 94. The hammer 88 is held toward one limiting set screw 98. In the other stable position (called a reset position) the trigger 82 is biased counter-clockwise and the hammer 88 is biased clockwise (both directions again being viewed as in Fig. 1) by the coupling spring 94. Movement of the trigger 82 and hammer 88 is restricted, at the limit, by the other set screw 96. Changeover between these positions is a snap action, and occurs whenever the pins 86, 92 at the ends of the spring 94 pass a straight line relationship with the toggle pin 90 on the hammer 88.

When the sensing of a tag 10 begins, the hammer 88 and the trigger 82 are in the start position. As the slide 40 is stepped toward the tag exit side, the stop member 60 on the slide 40 engages the upper tip of the trigger 82. Further advances of the slide 40 pivot the trigger 82 counter-clockwise (as viewed in Fig. 1). A predetermined amount of trigger 82 movement takes place before the hammer 88 is shifted, because of the hemispherical portion 84 of the trigger 82 in engagement with the toggle pin 90 of the hammer 88. At a predetermined point in the movement of the slide 40, however, the trigger 82 and hammer 88 snap to the reset position. At this predetermined point, the tag 10 has been completely sensed. The tag 10 has moved over the ejector arms 72, 74 on the ejector mechanism 70. The ejector control stud 102 moves through the clearance slot 58 in the slide 40 and pivots the ejector mechanism 70 counter-clockwise (as viewed in Fig. 1) by an ejector arm 74. The tag 10 is stripped from the slide 40 and is free to be ejected from the mechanism. The tag 10 may either slide down the inclined ejector arms 72, 74 or be pushed out by a succeeding tag. When the ejector control stud 102 is free of the ejector arm 74, the biasing spring 76 returns the ejector mechanism 70 to the slide 40.

The final movement of the slide 40 also closes the solenoid stop switch 36, providing a stop signal to the rotary solenoid 22. The rotary solenoid 22 is shut off and ready to be started again on insertion of a new tag 10 into the system.

The movement of the hammer 88 to the reset position brings the disengaging pin 104 on the hammer 88 into contact with the stepping pawl member 126 and the holding pawl member 132. The stepping pawl 128 and holding pawl are pivoted out of engagement with the teeth 44 on the slide 40. The slide 40 is therefore drawn back to its starting position by the biasing spring 50. The trigger 82 and hammer 88 are not returned to the start position until the slide 40 has almost reached the tag entry side. The reset member 62 on the slide 40 then engages the trigger 82 and pivots the trigger 82 clockwise (as viewed in Fig. 1). Accordingly, the trigger 82 and hammer 88 snap back to the start position. The mechanism is therefore completely set to receive, sense, and eject a new tag.

Thus, there has been provided a simple, compact, and efficient mechanism for sensing information recorded on a perforated record medium. The record medium is advanced in steps, and sensed at each step. At the completion of sensing, the record medium is removed and the mechanism is reset to receive a new record.

What is claimed is:

1. A card reader mechanism comprising a member, means for providing said member with repeated rotary movements from a start position, card-holding means movable along an axis, means selectively coooperating with said card-holding means and responsive to said rotary movements for advancing said card-holding means incrementally from a start position, means responsive to said rotary movements for sensing a card in synchronism with the operation of said advancing means, means in the path of movement of said card-holding means for removing a card from said card-holding means, and a toggle-type mechanism responsive to the position of said card-holding means for (1) actuating said card removing means and (2) disengaging said advancing means from said card holding means.

2. A card reader mechanism comprising a member means for providing said member with repeated rotary movements from a start position, card-holding means slidably movable along an axis from a start position, means biasing said card-holding means toward said start position, means including pawl members responsive to said rotary movements and selectively engaging said card-holding means for advancing said card-holding means incrementally from said start position, means responsive to said rotary movements for sensing a card in synchronism with the operation of said advancing means, output signal means responsive to said sensing means, means including pivoted members in the path of movement of said card-holding means selectively to remove a card from said card-holding means, and a toggle-type mechanism responsive to the position of said card-holding means for (1) actuating said card removing means and (2) disengaging said advancing means from said card-holding means.

3. A card reader mechanism comprising a member, means for providing said member with repeated rotary movements from a start position, a card-holding slide including toothed elements and movable along an axis, pawl means normally engaging said toothed elements and responsive to said rotary movements for advancing said card-holding slide by said toothed elements, means responsive to said rotary movements for sensing a card in synchronism with the operation of said pawl means, a card ejector mechanism in the path of movement of said card-holding slide, and a linkage mechanism responsive to the position of said card-holding slide and having a first stable position for (1) actuating said card ejector mechanism and (2) disengaging said pawl means from said toothed elements and a second stable position of non-cooperation with said ejector mechanism and said pawl means.

4. A card reader mechanism comprising a member, means for providing said member with repeated rotary movements from a start position, a card-holding slide including a row of toothed elements along an axis and slidably movable from a start position along said axis, means including a holding pawl, a stepping pawl normally engaging said toothed elements, and pawl crank means cammed by said member for advancing said card-holding slide by said toothed elements, means cammed by said member for sensing a card in synchronism with the operation of said advancing means, a pivoted card ejector mechanism in the path of movement of said card holding slide and so mounted as to intervene between a card and said slide as said slide is moved from its start position, and a linkage mechanism including a trigger member responsive to the position of said card-holding slide, said linkage mechanism having a first stable position for (1) pivoting said card ejector mechanism and (2) disengaging said holding pawl and stepping pawl from said toothed elements and a second stable position of non-engagement with said card ejector mechanism, said holding pawl, and said stepping pawl.

5. In a system for reading cards which includes a card-holding member to be advanced in successive increments from a start position and disengageable means for advancing said card-holding member, a mechanism for controlling said card-holding member comprising means biasing said card-holding member to a start position and a spring urged two-position linkage mechanism for disengaging said means for advancing said card-holding member when said member reaches a predetermined advanced position and until said member returns to said start position.

6. In a system for reading cards which includes a card-holding member to be advanced in successive increments from a start position and disengageable means for advancing said card-holding member, a mechanism for controlling movement of said card-holding member comprising means biasing said card-holding member to said start position, a pivotally mounted trigger member responsive to the position of said card-holding member, a pivotally mounted hammer member coupled to said trigger member and operable to disengage said means for advancing, and biasing means coupling said trigger member to said hammer member and tending to maintain said trigger member and said hammer member in one of two positional relationships, in only one of which said hammer member disengages said means for advancing from said card-holding member.

7. In a system for reading cards which includes a card-holding slide to be advanced in successive increments from a start position and disengageable means for advancing said slide, a mechanism for controlling movement of said slide comprising means biasing said card to said start position, stop and reset members mounted at predetermined points on said slide, a pivotally mounted trigger member registering with said stop and reset members and responsive to the position of said slide, a pivotally mounted hammer member coupled to said trigger member and operable to disengage said means for advancing, fixed members limiting the pivoting movement of said hammer member, and biasing means coupling said trigger member to said hammer member and tending to maintain said last named members in one of two relationships as determined by registration of said stop and reset members with said trigger member, said hammer member disengaging said means for advancing from said card-holding slide in only one of said relationships.

8. In a system for reading cards which includes a card-holding member advanced in successive increments from a start position and disengageable means for advancing said card-holding member, a mechanism for controlling said card-holding member to said start position, pivotally mounted means in the path of movement of said card-holding member and intervening between a card on said member and said member as said member is advanced, and a two-position linkage mechanism responsive to the position of said card-holding member for (1) pivoting said pivotally mounted means to remove a card on said member from said member and (2) disengaging said means for advancing said card-holding member.

9. A mechanism for sensing perforation combinations encoded in columns and rows of perforations on a record card, said mechanism comprising a base structure, a card-holding slide including means on a first side thereof for positioning a card to be sensed, said card-holding slide being movable from a starting position in said base structure in the plane of a card to be sensed and in the direction of the rows of perforations on said card, said slide including a row of teeth on a side opposite said first side and extending in the direction of movement of said slide, said slide also including guide holes in said first side, each guide hole being concentric with a different perforation position on a record card on said slide, said slide including a stop member and a reset member in a line parallel to the direction of slide movement, and said slide also having grooved surfaces extending in the direction of card movement on said first side, a central actuating shaft rotatably mounted in said base structure transverse to the direction of movement of said slide, signal-controlled rotary solenoid means for providing to said shaft rotary advance and return movements from and to a start position, a stepping control member mounted on said central actuating shaft, a pivotally mounted pawl crank member normal to said central actuating shaft and pivoting in response to the position of said stepping control member, a stepping pawl pivotally coupled to said pawl crank member and cooperating with the teeth on said slide to advance said slide, means coupled to said base structure normally urging said stepping pawl into engagement with said teeth, a holding pawl pivotally mounted in said base structure parallel to said stepping pawl, means coupled to said base structure normally urging said holding pawl into engagement with said teeth, an ejector mechanism pivotally mounted in the path of movement of said slide and including arm members registering with the grooved surfaces of said slide, stop signal providing means coupled to said rotary solenoid and responsive to the position of said slide, a toggle linkage mechanism comprising a trigger member and a hammer member each pivotally mounted in said base structure and a spring member providing tension between said trigger member and said hammer member, said trigger member being in the line of, and responsive to, the stop member and reset member on said slide and cooperating with said hammer member to provide stable stop and reset toggle positions, an ejector control stud mounted on said hammer member and pivoting said ejector mechanism in the stop toggle position, a disengaging pin mounted on said hammer member and disengaging said holding pawl and said stepping pawl from said teeth, means coupling said slide to said base structure for biasing said slide toward said start position, a plurality of resilient feeler members mounted in said base structure for sensing the perforation positions in a column of said card, a sensing control cam mounted on said central actuating shaft, a plurality of actuating fingers pivotally mounted in said base structure, each of said fingers pivoting in a different plane normal to the plane of said card and comprising two levers extending in fixed relation from the pivot point, a first of said levers engaging one of said feeler members and including a cam follower portion in operative relation to said sensing control cam, a plurality of biasing means each coupling the second lever of one of said fingers to said base structure to hold the cam follower portion on said first lever against said sensing control cam and said actuating finger in engagement with the associated feeler member, and a plurality of output switches, each responsive to the position of the second arm of a different one of said actuating fingers.

10. A card reader mechanism comprising a member, means for providing said member with repetitive movements from a start position, card-holding means movable along an axis, means selectively cooperating with said card-holding means and coupled to said member for advancing said card-holding means incrementally from a start position, means responsive to said repetitive movements for sensing a card in synchronism with the operation of said advancing means, means in the path of movement of said card-holding means for removing a card from said card-holding means, and a toggle-type mechanism responsive to the position of said card-holding means for (1) actuating said card removing means and (2) disengaging said advancing means from said card holding means.

No references cited.